United States Patent
Sohma et al.

(10) Patent No.: US 9,733,425 B2
(45) Date of Patent: Aug. 15, 2017

(54) OPTICAL FIBER AND PROCESS FOR PRODUCING THE SAME

(71) Applicant: SUMITOMO ELECTRIC INDUSTRIES, LTD., Osaka-shi, Osaka (JP)

(72) Inventors: Kazuyuki Sohma, Yokohama (JP); Noriaki Iwaguchi, Yokohama (JP); Takashi Fujii, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/823,000

(22) Filed: Aug. 11, 2015

(65) Prior Publication Data
US 2016/0047977 A1    Feb. 18, 2016

(30) Foreign Application Priority Data
Aug. 13, 2014    (JP) ................................ 2014-164879

(51) Int. Cl.
G02B 6/02 (2006.01)
C09D 175/16 (2006.01)
(Continued)

(52) U.S. Cl.
CPC ......... *G02B 6/02395* (2013.01); *C08G 18/10* (2013.01); *C08G 18/4825* (2013.01);
(Continued)

(58) Field of Classification Search
CPC . G02B 6/4403; G02B 6/4486; G02B 6/02395
See application file for complete search history.

(56) References Cited

U.S. PATENT DOCUMENTS

| | | | | |
|---|---|---|---|---|
| 5,703,141 A | * | 12/1997 | Jin | ............................ C09D 4/00 522/97 |
| 2007/0100039 A1 | * | 5/2007 | Hancock, Jr. | .......... C08F 283/00 524/186 |
| 2014/0341521 A1 | * | 11/2014 | Fabian | ................... G02B 6/245 385/128 |

FOREIGN PATENT DOCUMENTS

| | | |
|---|---|---|
| EP | 1070682 A1 | 1/2001 |
| JP | 4341872 B2 | 10/2009 |

OTHER PUBLICATIONS

U.S. Office Action dated Jan. 27, 2017 that issued in U.S. Appl. No. 15/143,687 including Double Patenting Rejections on pp. 9-11.

* cited by examiner

*Primary Examiner* — Sung Pak
*Assistant Examiner* — Hoang Tran
(74) *Attorney, Agent, or Firm* — Drinker Biddle & Reath LLP

(57) ABSTRACT

A process for producing an optical fiber including a glass fiber, a primary resin coating layer which covers the periphery of the glass fiber, and a secondary resin coating layer which covers the periphery of the primary resin coating layer, wherein the primary resin coating layer is formed by curing a curable resin composition which includes one or more oligomers, one or more monomers, and a reaction initiator, the curable resin composition containing a one-end-capped oligomer in an amount of 30% by mass or larger based on all the oligomers. The optical fiber produced by this production process does not deteriorate in low-temperature transmission loss, because the primary resin coating layer is inhibited from generating voids even when having a low Young's modulus.

8 Claims, 2 Drawing Sheets

(51) Int. Cl.
*C08G 18/48* (2006.01)
*C08G 18/67* (2006.01)
*C08G 18/75* (2006.01)
*C08G 18/10* (2006.01)

(52) U.S. Cl.
CPC ......... *C08G 18/672* (2013.01); *C08G 18/755* (2013.01); *C09D 175/16* (2013.01)

OPTICAL FIBER AND PROCESS FOR PRODUCING THE SAME

CROSS-REFERENCE TO RELATED APPLICATION

The present application claims the benefit of priority of Japanese Patent Applications No. 2014-164879, filed on Aug. 13, 2015, which is incorporated herein by reference.

BACKGROUND

Technical Field

The present invention relates to an optical fiber and a process for producing the optical fiber.

Background Art

Japanese Patent No. 4341872 describes a radiation-curable liquid resin composition for the inner primary coating of optical fibers, the composition containing an oligomer which has a reactive group at each of both ends.

Optical fibers are required to have resistance to lateral pressure. The resistance to lateral pressure is unsusceptibility to the transmission loss induced by micro-bending which occurs when lateral pressure is applied to the optical fiber. In order for an optical fiber to have resistance to lateral pressure, the inner coating layer needs to decrease its Young's modulus. According to the technique described in the patent document, it is necessary that the molecular weight of the oligomer should be increased for decreasing the Young's modulus of the primary coating of the optical fiber. In this case, however, toughness of the primary coating has been decreased to pose a problem in that polymer chains in the resin undergo irreversible breakage due to tension and accumulation thereof results in void generation. The presence of voids enhances low-temperature transmission loss.

SUMMARY OF THE INVENTION

An object of the invention is to provide an optical fiber in which the primary coating is inhibited from generating voids even when having a low Young's modulus and which hence does not deteriorate in low-temperature transmission loss, and to provide a process for producing the optical fiber.

The invention provides, according to one aspect thereof, an optical fiber including a glass fiber, a primary resin coating layer which covers the periphery of the glass fiber, and a secondary resin coating layer which covers the periphery of the primary resin coating layer, wherein the primary resin coating layer is a layer formed by curing a curable resin composition which includes one or more oligomers, one or more monomers, and a reaction initiator, the curable resin composition containing a one-end-capped oligomer in an amount of 30% by mass or larger based on all the oligomers.

The invention provides, according to another aspect thereof, a process for producing an optical fiber including a glass fiber which includes a core and a cladding, a primary resin coating layer which covers the periphery of the glass fiber, and a secondary resin coating layer which covers the periphery of the primary resin coating layer, wherein the primary resin coating layer is formed by curing a curable resin composition which includes one or more oligomers, one or more monomers, and a reaction initiator, the curable resin composition containing a one-end-capped oligomer in an amount of 30% by mass or larger based on all the oligomers.

According to the invention, it is possible to provide an optical fiber in which the primary coating is inhibited from generating voids even when having a decreased Young's modulus and which, due to the inhibited void generation, has excellent resistance to lateral pressure and does not deteriorate in low-temperature transmission loss.

DETAILED DESCRIPTION

Explanation on Embodiments of the Invention

Embodiments of the optical fiber according to the invention have any of the following features (1) to (8).

(1) An optical fiber including a glass fiber, a primary resin coating layer which covers the periphery of the glass fiber, and a secondary resin coating layer which covers the periphery of the primary resin coating layer, wherein
the primary resin coating layer is a layer formed by curing a curable resin composition which includes one or more oligomers, one or more monomers, and a reaction initiator, the curable resin composition containing a one-end-capped oligomer in an amount of 30% by mass or larger based on all the oligomers.

The optical fiber having the feature (1) shown above is presumed to produce the following effects since the curable resin composition for forming the primary resin coating layer contains a one-end-capped oligomer in an amount of 30% by mass or larger based on all the oligomers.

Figure 2A:
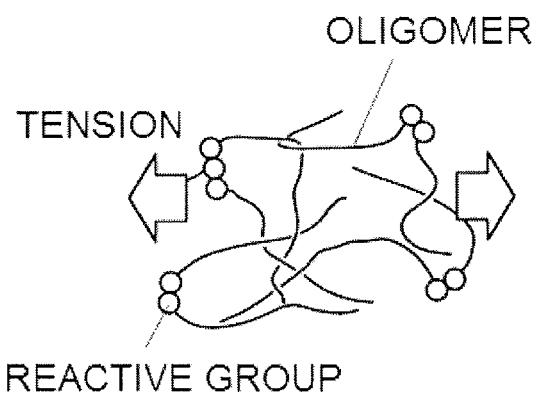
FIG. 2A is a diagrammatic cross-sectional view that illustrates the state in which oligomer chains derived from a one-end-capped oligomer are entangled in the primary resin coating layer of an embodiment of the optical fiber of the invention.
Figure 2B:
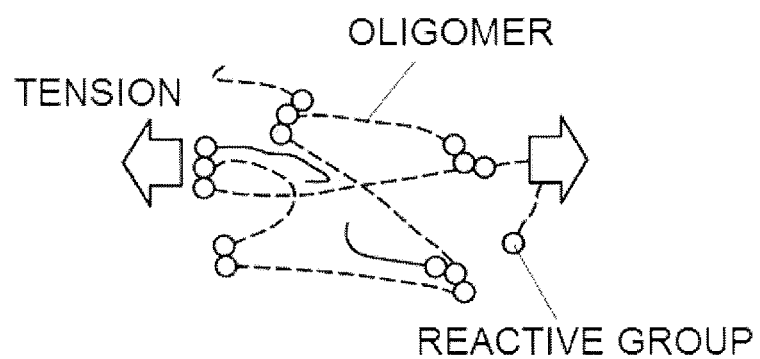
FIG. 2B is a diagrammatic cross-sectional view that illustrates the state in which oligomer chains derived from a one-end-capped oligomer are entangled in the primary resin coating layer of an embodiment of the optical fiber of the invention.

The oligomer in the primary resin coating layer has a decreased crosslinking-site density so that the primary resin coating layer can have a low Young's modulus. Furthermore, as shown in FIG. 2A, the nonreactive(capped)-end-side portions of oligomer chains (solid-line portions) derived from the one-end-capped oligomer are entangled with oligomer chains derived from another oligomer, or the oligomer chains are electrically bonded to one another. This "entanglement" or "electrical bonding" constitutes pseudo crosslinking. This pseudo crosslinking is different from the true crosslinking, such as that shown in FIG. 2B, formed by bonding between the reactive groups of a difunctional oligomer which has reactive groups in the both end (oligomer chains are broken-line portions), and the molecular chains extend, without rupturing, upon application of tension thereto and return to the original state upon removal of the tension. As a result, the primary resin coating layer is inhibited from generating voids therein and a deterioration in low-temperature transmission loss is avoided.

(2) It is preferable that the optical fiber should be a optical fiber including a glass fiber which includes a core and a cladding, a primary resin coating layer which covers the periphery of the glass fiber, and a secondary resin coating layer which covers the periphery of the primary resin coating layer, wherein the primary resin coating layer is a layer formed by curing a curable resin composition which includes one or more oligomers, one or more monomers, and a reaction initiator, the curable resin composition containing a one-end-capped oligomer in an amount of 60% by mass or larger based on all the oligomers. This is because the effect described above is enhanced in this optical fiber.

(3) It is more preferable that the curable resin composition should contain the one-end-capped oligomer in an amount of 80% by mass or larger based on all the oligomers. This is because that effect is further enhanced.

(4) It is preferable that the reactive end of the one-end-capped oligomer should be a hydroxyethyl acrylate residue. This is because high photoreactivity can be imparted.

(5) It is preferable that the oligomers contained in the curable resin composition should include a urethane (meth)acrylate oligomer. This is because this composition is suitable for obtaining a cured object having high strength and high elongation.

(6) It is preferable that the glass fiber should have an effective cross-sectional area of the core of 115 μm² or larger and the primary resin coating layer have a Young's modulus of 0.5 MPa or less. This is because not only the high lateral-pressure resistance of the optical fiber can be ensured but also the deterioration in low-temperature transmission loss is remarkably mitigated.

(7) It is preferable that the Young's modulus should be 0.3 MPa or less. This is because not only the high lateral-pressure resistance of the optical fiber can be ensured but also the deterioration in low-temperature transmission loss is highly remarkably mitigated.

Embodiments of the process according to the invention for producing an optical fiber have the following feature (8).

(8) A process for producing an optical fiber including a glass fiber which includes a core and a cladding, a primary resin coating layer which covers the periphery of the glass fiber, and a secondary resin coating layer which covers the periphery of the primary resin coating layer, wherein
the primary resin coating layer is formed by curing a curable resin composition which includes one or more oligomers, one or more monomers, and a reaction initiator,
the curable resin composition containing a one-end-capped oligomer in an amount of 30% by mass or larger based on all the oligomers.

Details of Embodiments of the Invention

Embodiments of the invention are explained below in detail by reference to FIG. 1.

(Outline of the Optical Fiber)

Figure 1:
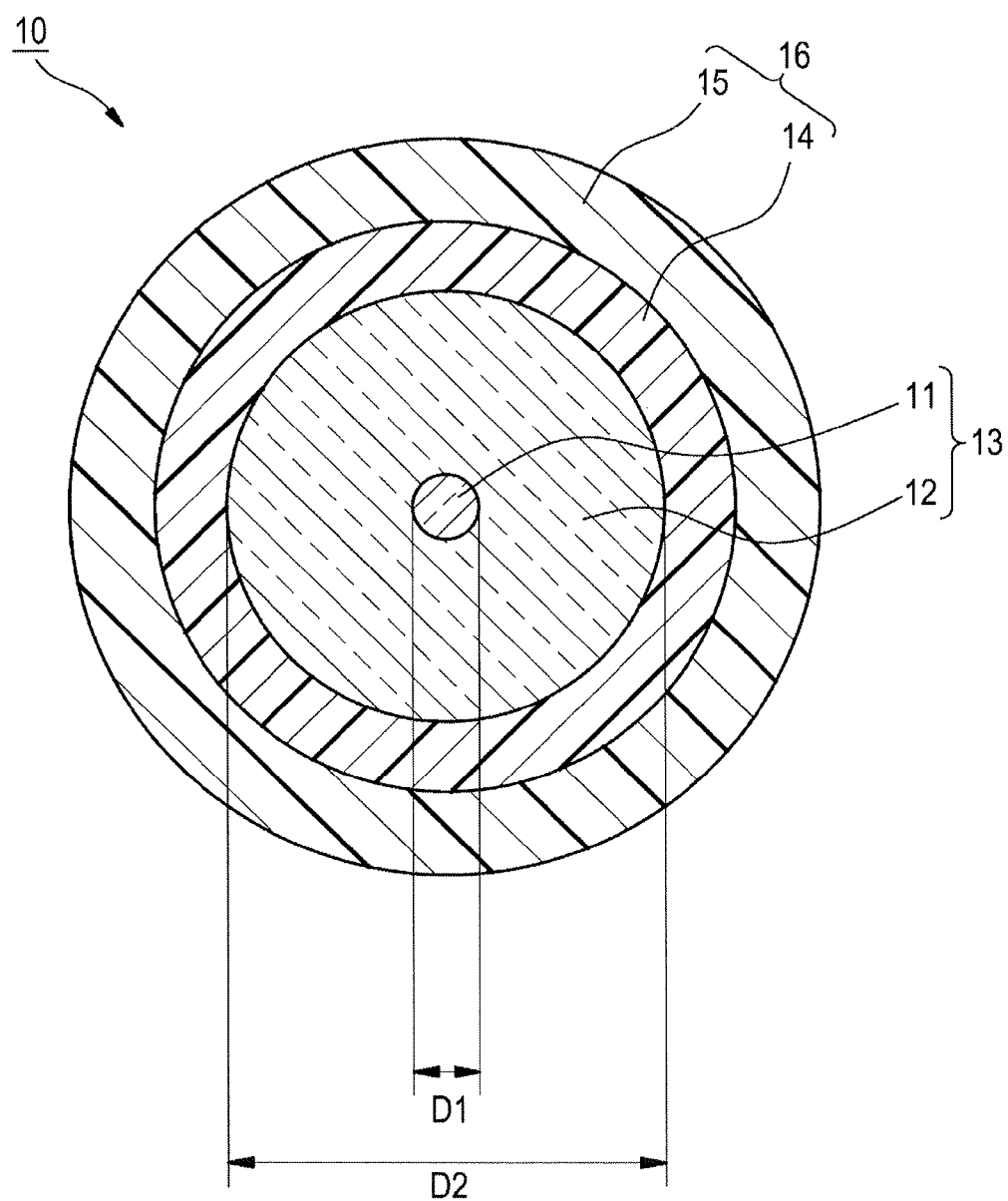
FIG. 1 is a diagrammatic cross-sectional view which illustrates an embodiment of the optical fiber of the invention.

FIG. 1 is a diagrammatic cross-sectional view which illustrates one embodiment of the optical fiber of the invention.

The optical fiber 10 includes a glass fiber 13 and, disposed on the periphery thereof, a resin coating layer 16 which includes an inner layer 14 and an outer layer 15 that each have been formed from an ultraviolet-curable resin composition (hereinafter also referred to simply as "resin composition"). The glass fiber 13 is configured of a core 11 and a cladding 12. For example, quartz to which germanium has been added can be used as the core 11, and either pure quartz or quartz to which fluorine has been added can be used as the cladding 12.

In FIG. 1, the diameter (D2) of the glass fiber 13 is, for example, about 125 μm. The resin coating layer 16 is configured of two layers, i.e., an inner layer 14 and an outer layer 15. The overall thickness of the resin coating layer 16 is usually 62.5 μm. The thickness of the inner layer 14 and that of the outer layer 15 are substantially the same, and each are 20-40 μm. Specifically, the thickness of the inner layer 14 may be 37.5 μm, and that of the outer layer 15 may be 25 μm.

(Resin Compositions)

In this embodiment, the resin compositions for forming the resin coating layer each include one or more oligomers, one or more monomers, and a reaction initiator.

(Oligomers)

Examples of the oligomers include urethane acrylates, epoxy acrylates, or mixtures of these. Preferred are urethane acrylates.

Examples of the urethane acrylates include ones obtained by reacting a polyol compound, a polyisocyanate compound, and a hydroxyl-containing acrylate compound.

Examples of the polyol compound include poly(tetramethylene glycol), poly(propylene glycol), and a bisphenol A/ethylene oxide adduct diol. Examples of the polyisocyanate compound include 2,4-tolylene diisocyanate, 2,6-tolylene diisocyanate, and isophorone diisocyanate. Examples of the hydroxyl-containing acrylate compound include 2-hydroxyethyl acrylate, 2-hydroxypropyl acrylate, 2-hydroxybutyl acrylate, 1,6-hexanediol monoacrylate, pentaerythritol triacrylate, 2-hydroxypropyl acrylate, and tripropylene glycol diaciylate.

The resin composition for forming the inner layer 14 contains a one-end-capped oligomer in an amount of 30% by mass or larger based on all the oligomers. In this description of the invention a nonreactive terminus of an oligomer is called a "capped end". One-end-capped oligomer means an oligomer which has a nonreactive terminus and a reactive group on the other end. The nonreactive terminus may be obtained by deactivating a reactive group in the terminus. The content of this one-end-capped oligomer is preferably 40% by mass or larger, more preferably 80% by mass or larger.

It is preferable that the reactive end of this one-end-capped oligomer should be a hydroxyethyl acrylate residue.

Either a lower alcohol having up to 5 carbon atoms or a silane coupling agent has been bonded to the other end. As the silane coupling agent, use can be made of various silane coupling agents having a reactive functional group which is an amino, epoxy, (melh)acryloyl, vinyl, or mercapto group.

(Monomers)

Examples of the monomers include N-vinyl monomers having a cyclic structure, such as, for example, N-vinylpyrrolidone, N-vinylcaprolactam, and acryloylmorpholine. These monomers are preferred because the resin composition containing any of these monomers has an improved curing rate. Usable besides these are monofunctional monomers such as isobornyl acrylate, tricyclodecanyl acrylate, benzyl acrylate, dicyclopentanyl acrylate, 2-hydroxyethyl acrylate, nonylphenyl acrylate, phenoxyethyl acrylate, and poly(propylene glycol) monoacrylate and polyfunctional monomers such as poly(ethylene glycol) diacrylate, tricyclodecanediyldimethylene diacrylate, or bisphenol A/ethylene oxide adduct diol diacrylates.

(Reaction Initiator)

Examples of the reaction initiator include 1-hydroxycyclohexyl phenyl ketone, 2,2-d imethoxy-2-phenylacetophenone, 1-(4-isopropylphenyl)-2-hydroxy-2-methylpropan-1-one, 2,4,4-trimethylpentylphosphine oxide, 2,4,4-trimethylbenzoyldiphenylphosphine oxide, 2-methyl-1-[4-(methylthio)phenyl]-2-morpholinopropan-1-one (Irgacure 907, manufactured by Ciba Specialty Chemicals Co.), and 2,4,6-trimethylbenzoyldiphenylphosphine oxide (Lucirin TPO, manufactured by BASF A.G.).

(Other Ingredients)

The resin compositions may contain a silane coupling agent, an antioxidant, a photosensitizer, etc.

(Other Properties)

In this embodiment, the glass fiber 13 has an effective cross-sectional area of the core of 115 µm² or larger, and the inner layer 14 has a Young's modulus of 0.5 MPa or less. It is, however, preferable that the effective cross-sectional area of the core should be 130 µm² or larger and the Young's modulus should be 0.3 MPa or less.

The Young's modulus of the inner layer 14 (primary coating layer is measured by the following method.

Inner layer 14: The Young's modulus is measured by a pullout modulus test at 23° C. Specifically, the resin coating layer 16 of the optical fiber 10 is incised with a razor blade or the like to cut the resin coating layer 16, and the optical glass fiber 13 is pulled out while keeping the resin coating layer 16 (inner layer 14 and outer layer 15) fixed. The stress imposed on the inner layer 14 is determined from the amount in which the inner layer 14 undergoes an elastic deformation before the optical glass fiber 13 is pulled out and from the force used for pulling the optical glass fiber 13.

Meanwhile, in order for an optical fiber to be increased in communication capacity per core by digital coherent communication technology including multi-level modulation technology, the optical fiber is required to have a higher optical-signal-to-noise ratio (OSNR). One method for improving OSNR is to reduce nonlinearity.

For reducing nonlinearity, it is necessary to increase the effective cross-sectional area of the core of the glass fiber as much as possible and to decrease the transmission loss. However, the former expedient, i.e., to increase the effective cross-sectional area of the core, means that the optical fiber comes to have poor resistance to lateral pressure, and it becomes necessary that the primary resin coating layer should have a Young's modulus as low as 0.20 MPa or below.

In the case of forming a primary resin coating layer having a low Young's modulus, a conventional method therefor is to increase the molecular weight of the oligomer to be incorporated into a resin composition for forming the primary resin coating layer, thereby forming a sparse polymer network (lowering the density of crosslinking sites). However, the resin coating layer formed by this method, although having an improved elongation, has decreased strength and has a problem in that polymer chains in the resin undergo irreversible cleavages due to tension and accumulation thereof results in void generation in the resin coating layer during handling.

In the case where there are no voids, the transmission loss at −40° C. is lower than the transmission loss measured at 23° C. In the case where there are voids, however, the transmission loss at −40° C. is higher than the transmission loss measured at 23° C.; the presence of voids enhances the low-temperature transmission loss.

In this embodiment, in order for the optical fiber to be inhibited froin suffering void generation in the primary resin coating layer even when this coating layer has a low Young's modulus and to be thereby prevented from deteriorating in low-temperature transmission loss, a resin composition containing a one-end-capped oligomer in an amount of 30% by mass or larger based on all the oligomers was used for forming the inner layer 14. As a result, the inner layer 14 can be made to have a low Young's modulus, and this layer extends, without rupturing, upon application of tension thereto and returns to the original state upon removal of the tension. Thus, an optical fiber prevented from deteriorating in low-temperature transmission loss was able to be obtained.

[Examples]

The results of evaluation tests to which Examples according to the present invention and Comparative Examples were subjected are shown below to explain the invention in more detail. The invention should not be construed as being limited to the following Examples.

[Production of Optical Fibers 10]

As glass fibers 13, use was made of glass fibers which each were configured of a core and a cladding and had an outer diameter (D2) of 125 µm, the effective cross-sectional area of the core being shown in Table 1 given later. The resin composition for inner-layer formation and resin composition for outer-layer formation which respectively had the makeups shown below were applied to the peripheral surface of each glass fiber 13 and cured to coat the surface with two layers (an inner layer 14 and an outer layer 15), thereby forming a resin coating layer 16. Thus, optical fibers 10 were produced. The thickness of the inner layer 14 was regulated to 35 µm, and the thickness of the outer layer 15 was regulated to 25 µm.

(Resin Composition for Inner-Layer Formation)

| | |
|---|---|
| Urethane acrylate oligomer(s) having the makeup shown in Table 1 | 65 parts by mass |
| Ethoxynonylphenyl acrylate | 5.5 parts by mass |
| Isobornyl acrylate | 20.5 parts by mass |
| N-Vinylcaprolactam | 7.0 parts by mass |
| 2,4,4-Trimethylbenzoyldiphenylphosphine oxide (reaction initiator) | 1.2 parts by mass |
| (Additives) | |
| Antioxidant, Irganox 1035 | 0.8 parts by mass |
| Light stabilizer, 2-hydroxy-4-methoxybenzophenone | 0.15 parts by mass |

(Resin Composition for Outer-Layer Formation)

| | |
|---|---|
| Urethane acrylate oligomer obtained by reacting diisocyanate and hydroxy acrylate with poly(propylene glycol) diol | 50 parts by mass |
| Epoxy acrylate | 20 parts by mass |
| Isobornyl acrylate | 10 parts by mass |
| N-Vinylpyrrolidone | 5 parts by mass |
| Ethoxynonylphenyl acrylate | 15 parts by mass |
| 2,4,4-Trimethylbenzoyldiphenylphosphine oxide (reaction initiator) | 2 parts by mass |

[Evaluation of the Optical Fibers 10]

Each of the optical fibers produced was subjected to the following evaluation tests (Young's modulus of the inner layer, low-temperature transmission loss). The results thereof are shown in Table 1 below.

(Young's Modulus of Inner Layer)

The Young's modulus of the inner layer 14 was measured by a pullout modulus test at 23° C. Specifically, the resin coating layer 16 of the optical fiber 10 was incised with a razor blade or the like to cut the resin coating layer 16, and the optical glass fiber 13 was pulled out while keeping the resin coating layer 16 (inner layer 14 and outer layer 15) fixed. The stress imposed on the inner layer 14 was determined from the amount in which the inner layer 14 had undergone an elastic deformation before the optical glass fiber 13 was pulled out and from the force used for pulling the optical glass fiber 13. The results thereof are shown in Table 1 below.

(Resistance to Lateral Pressure)

The difference in transmission loss was determined by subtracting the transmission loss of the optical fiber in the state of having been loosely bundled and looped, without being wound around any bobbin, from the transmission loss of the same optical fiber in the state of having been wound around a bobbin on the body of which a metal mesh had been wound. The mesh consists of a metal wire having an outer diameter of 50 μm. The pitch of the mesh was 150 μm. The case where that difference was less than 0.6 dB/km is indicated by A, the case where that difference was 0.6 or larger but less than 1.0 is indicated by B, and the case where that difference was 1.0 or larger is indicated by C; A and B were rated as acceptable.

(Low-Temperature Transmission Loss)

Using a capstan device and a roller, a tension of 2.2 kg was applied to the optical fiber 10.

The optical fiber 10 to which the tension was being applied was examined for the property of transmitting signals having a wavelength of 1,550 nm, under the temperature conditions of each of 23° C. and −40° C. The optical fiber 10 was thus evaluated for transmission loss at 23° C. and −40° C. The case where the difference between the transmission loss at −40° C. and the transmission loss at 23° C. (transmission loss difference) was less than 0 dB/km was rated as A, the case where that difference was 0 dB/km or larger but less than 0.01 dB/km was rated as B, and the case where that difference was 0.01 dB/km or larger was rated as C. The values rated as A and B were acceptable. The results thereof are shown in Table 1 below.

In the following Table 1, Nos. 1 to 18 are Examples, and Nos. 19 to 30 are Comparative Examples.

TABLE 1

| No. | Urethane acrylate oligomer makeup and average molecular weight thereof in resin composition for inner-layer formation*[1] | Effective cross-sectional area of core of glass fiber (μm²) | Young's modulus of inner layer (MPa) | Low-temperature transmission loss | Resistance to lateral pressure |
|---|---|---|---|---|---|
| 1 | A | 80 | ≤0.1 | A | A |
| 2 | A | 115 | ≤0.1 | A | A |
| 3 | A | 130 | ≤0.1 | B | A |
| 4 | A | 150 | ≤0.1 | B | A |
| 5 | A | 165 | ≤0.1 | B | A |
| 6 | B | 115 | ≤0.2 | A | A |
| 7 | B | 130 | ≤0.2 | A | A |
| 8 | B | 150 | ≤0.2 | A | A |
| 9 | B | 165 | ≤0.2 | A | A |
| 10 | C | 115 | ≤0.3 | A | A |
| 11 | C | 130 | ≤0.3 | A | B |
| 12 | C | 150 | ≤0.3 | A | B |
| 13 | C | 165 | ≤0.3 | A | B |
| 14 | D | 80 | ≤0.5 | A | A |
| 15 | D | 115 | ≤0.5 | A | A |
| 16 | D | 130 | ≤0.5 | A | A |
| 17 | D | 150 | ≤0.5 | A | B |
| 18 | D | 165 | ≤0.5 | A | B |
| 19 | E | 115 | ≤0.7 | A | C |
| 20 | E | 130 | ≤0.7 | A | C |
| 21 | E | 150 | ≤0.7 | A | C |
| 22 | E | 165 | ≤0.7 | A | C |
| 23 | F | 115 | ≤0.9 | A | C |
| 24 | F | 130 | ≤0.9 | A | C |
| 25 | F | 150 | ≤0.9 | A | C |
| 26 | F | 165 | ≤0.9 | A | C |
| 27 | G | 115 | ≤0.3 | C | A |
| 28 | G | 130 | ≤0.3 | C | B |
| 29 | G | 150 | ≤0.3 | C | B |
| 30 | G | 165 | ≤0.3 | C | C |

*[1]Urethane Acrylate Oligomer Makeup (all %'s are by mass)

| | | |
|---|---|---|
| A: | One-end-capped oligomer | 100% |
| | Both-ends-reactive oligomer | 0% |
| | Average molecular weight | 4,500 |
| B: | One-end-capped oligomer | 80% |
| | Both-ends-reactive oligomer | 20% |
| | Average molecular weight | 4,500 |
| C: | One-end-capped oligomer | 60% |
| | Both-ends-reactive oligomer | 40% |
| | Average molecular weight | 4,500 |
| D: | One-end-capped oligomer | 30% |
| | Both-ends-reactive oligomer | 70% |
| | Average molecular weight | 4,500 |
| E: | One-end-capped oligomer | 20% |
| | Both-ends-reactive oligomer | 80% |
| | Average molecular weight | 4,500 |
| F: | One-end-capped oligomer | 0% |
| | Both-ends-reactive oligomer | 100% |
| | Average molecular weight | 4,500 |
| G: | One-end-capped oligomer | 0% |
| | Both-ends-reactive oligomer | 100% |
| | Average molecular weight | 6,500 |

The structures of the one-end-capped oligomer and both-ends-reactive oligomer are as follows.

One-End-Capped Oligomer:

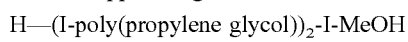

H—(I-poly(propylene glycol))$_2$-I-MeOH

Both-Ends-Reactive Oligomer:

H—(I-poly(propylene glycol))$_2$-I—H

In the expressions of oligomers, H represents a residue of hydroxyethyl acrylate, I represents a residue of isophorone diisocyanate, MeOH represents a residue of methanol, and poly(propylene glycol) represents a residue of poly(propylene glycol).

The optical fibers Nos. 1 to 13 shown in Table 1 were each able to have a low-temperature transmission loss decreased to a value within the acceptable range and further have a transmission-loss difference regarding lateral-pressure resistance which had been decreased to a value within the acceptable range, since the resin compositions for inner-layer formation had contained a one-end-capped oligomer in an amount of 60% by mass or larger based on all the oligomer(s). It can be seen from a comparison between Nos. 10 to 13 and Nos. 27 to 30 that the configuration of the invention was able to attain a decrease in low-temperature transmission loss, although the former and the latter configurations had the same Young's modulus.

The optical fibers Nos. 14 to 18 were each able to have a low-temperature transmission loss decreased to a value within the acceptable range and further have a transmission-loss difference regarding lateral-pressure resistance which had been decreased to a value within the acceptable range, since the resin composition had contained a one-end-capped oligomer in an amount of 30% by mass or larger based on all the oligomer(s).

The optical fibers Nos. 1 to 9 shown in Table 1 were each able to be decreased especially in low-temperature transmission loss and in the measured value regarding lateral-pressure resistance (rated as A) irrespective of the effective cross-sectional area of the core of the glass fiber, since the resin compositions for inner-layer formation had contained a one-end-capped oligomer in an amount of 80% by mass or larger based on all the oligomer(s).

The invention claimed is:

1. An optical fiber comprising a glass fiber which comprises a core and a cladding, a primary resin coating layer which covers the periphery of the glass fiber, and a secondary resin coating layer which covers the periphery of the primary resin coating layer, wherein
the primary resin coating layer is a layer formed by curing a curable resin composition which comprises oligomers, monomers, and a reaction initiator, the curable resin composition containing an oligomer having a nonreactive terminus and a reactive group on the other end in an amount of 30% by mass or larger based on all the oligomers.

2. The optical fiber according to claim 1, the curable resin composition contains the oligomer having a nonreactive terminus and a reactive group on the other end in an amount of 60% by mass or larger based on all the oligomers.

3. The optical fiber according to claim 2, wherein the curable resin composition contains the oligomer having a nonreactive terminus and a reactive group on the other end in an amount of 80% by mass or larger based on all the oligomers.

4. The optical fiber according to claim 1, wherein the reactive end of the oligomer having a nonreactive terminus and a reactive group on the other end is a hydroxyethyl acrylate residue.

5. The optical fiber according to claim 1, wherein the oligomers contained in the curable resin composition include a urethane (meth)acrylate oligomer.

6. The optical fiber according to claim 1, wherein the glass fiber has an effective cross-sectional area of the core of 115 $\mu m^2$ or larger and the primary resin coating layer has a Young's modulus of 0.5 MPa or less.

7. The optical fiber according to claim 1, wherein the primary resin coating layer has a Young's modulus of 0.3 MPa or less.

8. A process for producing an optical fiber comprising a glass fiber which comprises a core and a cladding, a primary resin coating layer which covers the periphery of the glass fiber, and a secondary resin coating layer which covers the periphery of the primary resin coating layer, wherein
the primary resin coating layer is formed by curing a curable resin composition which comprises one or more oligomers, one or more monomers, and a reaction initiator,
the curable resin composition containing an oligomer having a nonreactive terminus and a reactive group on the other end in an amount of 30% by mass or larger based on all the oligomers.

* * * * *